March 29, 1932. W. W. CARSON, JR 1,851,420
FEEDING DEVICE FOR STRIP MATERIALS
Filed Sept. 23, 1930
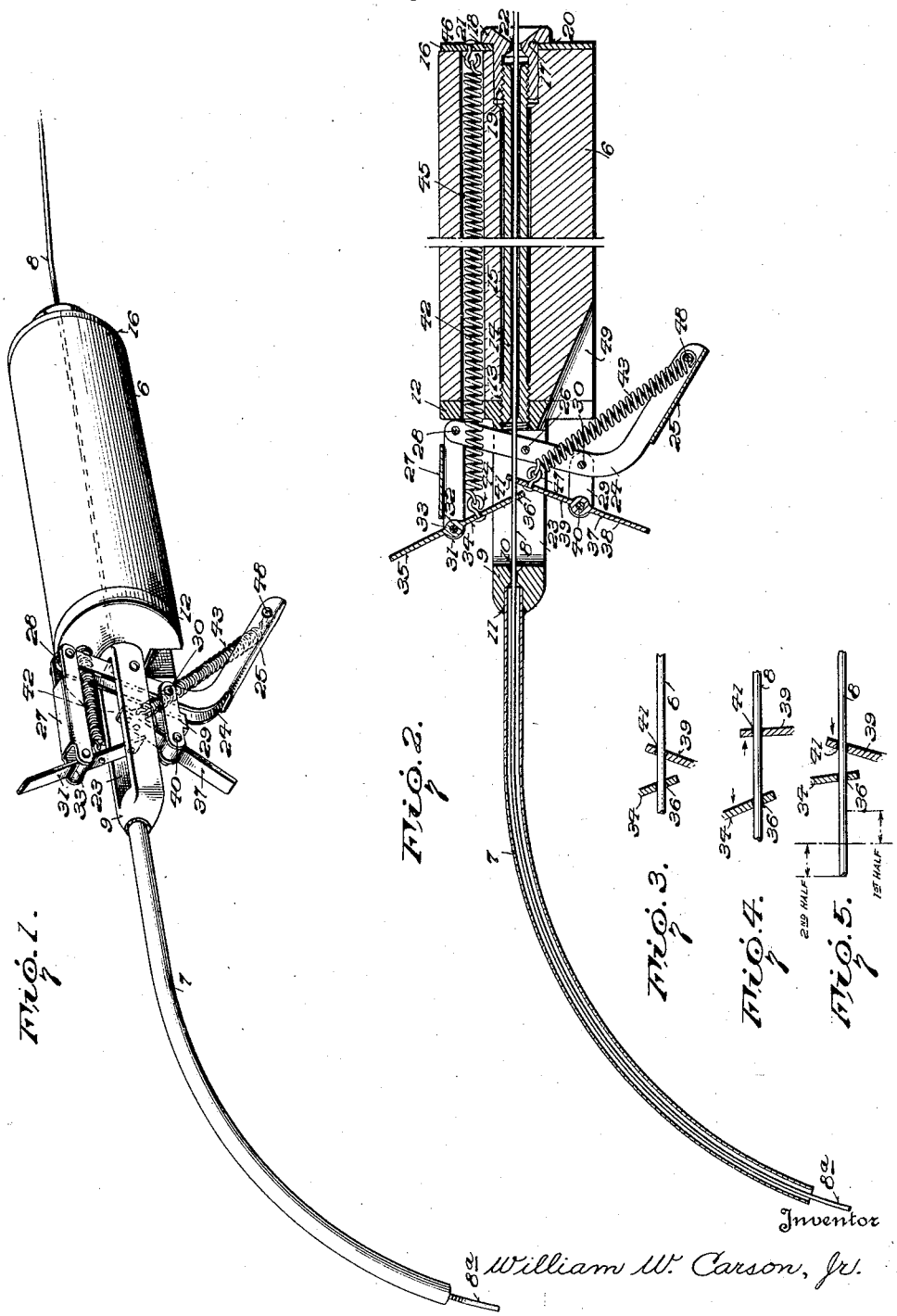
Inventor
William W. Carson, Jr.
By Cameron, Kerkam & Sutton.
Attorneys Patented Mar. 29, 1932

1,851,420

UNITED STATES PATENT OFFICE

WILLIAM W. CARSON, JR., OF KNOXVILLE, TENNESSEE, ASSIGNOR TO THE FULTON SYLPHON COMPANY, OF KNOXVILLE, TENNESSEE, A CORPORATION OF DELAWARE

FEEDING DEVICE FOR STRIP MATERIALS

Application filed September 23, 1930. Serial No. 483,955.

This invention relates to a device for feeding strip material and more particularly to a device for feeding a soldering material in strip or wire form.

One of the objects of the present invention is to provide a novel holding device for a strip material which will firmly grip the material strip at all times.

Another object of the present invention is to provide a novel apparatus for holding a strip of solder or other material, which has operable mechanism for firmly gripping the strip at all times and which may be actuated for advancing the strip through the apparatus.

Another object of the present invention is to provide a novel apparatus for holding a strip of material which has operable mechanism for successively advancing the strip several times during one complete actuation of the operating means.

Another object of the present invention is to provide a novel apparatus for holding a strip material having mechanism that may be operated to advance the material as needed, that may be conveniently and comfortably handled to direct the strip in use, that is simple and compact in structure, and efficient for the purpose intended.

These and other objects will be more apparent from the following description and drawings in which like reference characters denote like parts throughout the several views. It is to be expressly understood, however, that the drawings are for the purpose of illustration only and do not define the limits of the invention, reference being had for this purpose to the appended claims.

In the drawings:

Fig. 1 is a perspective view of one form of a strip feeding device constituting the present invention;

Fig. 2 is a horizontal sectional view of the strip feeding device shown in Fig. 1;

Fig. 3 is a detailed sectional view of the gripping members and material strip, showing their normal relative position;

Fig. 4 is a detailed sectional view similar to Fig. 3 showing the relative position and direction of movement of the gripping members during the initial actuation of the operating means; and Fig. 5 is a detailed sectional view similar to Fig. 3 showing the relative position and direction of movement of the gripping members during the second half or final actuation of the operating means.

In the illustrated embodiment of the present invention, 6 indicates a hand grip member and 7 a hollow directing tube for holding, advancing and directing a strip of material, such as a hard silver solder 8 in wire or strip form, which extends through the hollow grip member 6 and hollow directing tube 7. The grip member 6 and tube 7 are held in assembled relation by means of a member 9 provided with a bore 10 countersunk at one end as at 11, and a circular disk 12 at the other end. The hollow directing tube 7 is inserted in the countersunk bore 11 of the member 9 and rigidly secured thereto by any well known means, such as soldering or welding. The circular plate 12 at the other end of the member 9 is provided with a centrally disposed hole 13 which is interiorly threaded for receiving the threaded end of a tubular bushing 14, extending through a centrally located bore 15 in the grip member 6. A circular end plate 16 having an aperture 17 is provided at the other end of the grip member 6 and the entire structure is held in assembled relation by means of a nut 18 having internal threads 19 cooperating with external threads on the other end of the tubular bushing 14. The nut 18 is provided with a shoulder 20 which engages the plate 16 about the aperture 17 and when tightly screwed onto the threaded end of the bushing 14 holds the plates 16 and 12 firmly in position of the grip member 6. An aperture 22 is provided centrally of the nut 18 of less diameter than the internal threads 19 for the purpose of receiving the material strip 8.

Intermediate the grip member 6 and directing tube 7 a novel mechanism has been provided for firmly gripping the material strip and advancing the same as needed, such as in the art of soldering. To this end a rectangular opening 23 is provided in the member 9 for receiving the mechanism. The mechanism is supported on a pivoted lever 24 having a handle part 25 for operating the lever about its pivotal axis. Preferably the handle part 25 is in the form of a channel having a back web and side ribs, the back web extending only a short distance to make the lever of a rigid construction leaving the side rib extensions to constitute the greater part of the lever. These side ribs are pivoted to the member 9 at the sides of the opening 23 by means of a pin 26 positioned slightly below the aligned bore in the tube 7 and bushing 14.

A linkage 27 preferably in the form of a channel having a back web and side ribs, is pivotally connected to the end of the lever 24, opposite from the handle end 25, by means of a pivot pin 28 extending through the side ribs of the lever 24 and the side ribs of the link member 27. A second connecting link 29, similar in construction to the link 27, is provided on the opposite side of the pivot 26 of the lever 24 and adjacent to the handle 25. This link 29 is shorter than the link 27 and is connected to the two side ribs of the lever 24 by means of a pin 30 extending through the same.

In the form shown a gripping plate member 31 is pivotally mounted at the opposite end of the link 27, from the end pivoted to the lever 24, and is positioned between the side ribs of the channel by means of an axial bore 32 and pin 33. When so mounted the plate forms a gripping arm 34 extending into the opening 23 in the member 9 and an arm 35 extending in the opposite direction. An aperture 36 is provided adjacent the end of the arm 34 of a slightly greater diameter than the width of the strip 8. A similar plate 37 forming extension arms 38 and 39 is pivotally mounted between the side ribs of the link 29 by means of a pivot pin 40. An aperture 41 is provided adjacent the end of the arm 39 of a slightly greater diameter than the width of the strip 8. The material strip 8 is extended through the aperture 22 of the nut 18 and bushing 14 into the rectangular opening 23 formed in the member 9, hence through the two apertures 41 and 36 of the plate members 37 and 31, respectively, and then outward through the directing tube 7. With this arrangement, when the plate members 31 and 37 are rotated to the position shown in Fig. 2, the edges formed by the apertures 36 and 41 will firmly grip the strip 8 and hold the same in any given position.

To cause this rotation of the plate members about their pivots and to resiliently hold the plates in pivoted position, springs 42 and 43 are provided. In the preferred construction spring 42 is connected to the plate 31 by means of an eye bolt 44 positioned in the plate between the aperture 36 and pivot pin 33. This spring extends through a bore 45 in the grip member 6 and is rigidly attached to the end plate 16 by means of an eye bolt 46 secured thereto. The spring 43 is secured to the plate 37 by means of an eye bolt 47 positioned on the arm 39 between the aperture 41 and the pivot pin 40. The other end of the spring 43 is connected with the end of the handle 25 of the lever 24 by means of a pin 48 extending through the side ribs of the channel 25 forming the handle. With this arrangement the plate 31 is caused to rotate in a counter-clockwise direction until the edges of the aperture 35 firmly grip the strip 8 and the plate 37 is caused to rotate in a clockwise direction until the edges of the aperture 41 firmly grip the strip 8 at a point in back of the plate 31 due to the shorter link 29. Further, the spring 42 tends to hold the lever 24 in a normal position where the opposite end from the handle 25 is in engagement with the end plate 12. Preferably a recess 49 is cut in the circular plate 12 and grip member 6 for receiving the handle 25 of lever 24 and spring 43 allowing a greater movement of the handle 25.

The operation of the device is as follows:

A strip material such as a hard silver solder is taken from a reel in coil form and threaded through the aperture 22 of the nut 18, the bushing 14, the apertures 41 and 36 of the plate members 37 and 31, then through the aperture 10 into the hollow directing tube 7. The arms 35 and 38 of the plate members 31 and 37 are provided for moving the plate members about their pivots to facilitate the insertion of the strip 8 through the apertures 41 and 36. In this normal position of the operating mechanism, the strip 8 is firmly gripped by the plate members, as shown in Fig. 3, and an operator holding the grip member 6, may easily direct the position of the extension 8a of the strip 8 at the end of the hollow tube section 7.

When more of the strip material is needed the operator with one finger pulls the handle 25 of the trigger lever 24 causing the link 27 and plate 31 to move to the left, as seen in Fig. 2. against the action of the spring 42. As the edges of the aperture 36 firmly grip the strip 8 the strip will be advanced an amount equal to the advancement of the link 27. During this time, the link 29 and plate 37 being attached to the lever 24 on the opposite side of the pivot 26, will be retracted or moved to the right, as more clearly shown in Fig. 4. As this motion tends to rotate the plate 37 in opposition to the rotation of the plate 37 caused by the spring, it will cause the edges of the aperture 41 to release their grip on the strip 8 and the strip being advanced by the plate 31 will merely slide through the aperture 41. The operator then holds the handle 25 of the lever 24 in this position until the material strip 8a has been expended and more material is needed. At this time the operator releases the handle 25 and the spring 42 through the plate 31 and link 27 will cause the lever 24 to be moved in a clockwise direction about the pivot 26. At this time, the link 29 and plate 37 are moved to the left and the edges of the aperture 41 having a firm grip on the strip 8 will advance the strip an amount equal to the movement of the link 29. During this time the link 27 and plate 31 will be moved to the right, and as the movement is in opposition to the pivotal movement of the plate, the edges of the aperture 36 will release their grip and the strip 8 will freely slip through the aperture. The relative movement of the two plate members in this second half of the operation of the lever 24 is clearly shown in Fig. 5.

As will be readily apparent, a novel mechanism has been provided which may be easily manipulated for holding, directing and feeding strip material, which is comfortable and easy to use, compact and simple in form, and efficient for the purpose intended. Further, with a device constructed in accordance with the present invention the operator may successively advance the material strip several times by one complete manipulation of the oprating lever. Although but one embodiment of the present invention has been shown and described in detail, it is to be understood that this embodiment is not exclusive, but various modifications may be made and certain features used without other features without departing from the spirit of the invention. Reference is therefore to be had to the claims appended hereto for a definition of the scope of the invention.

What is claimed is:

1. In a feeding device for strip material, a holder adapted to support a material strip, and a pivoted plate rotatable about a fixed pivot and having an aperture through which the strip extends, said plate being resiliently held in angular relation with respect to the strip so that the edges of the aperture will firmly grip the strip.

2. In a feeding device for strip material, a holder adapted to support a material strip, an angularly disposed plate having an aperture through which the strip extends, the edges of said aperture being adapted to firmly grip the strip on opposite sides, and means for bodily moving the plate to advance the strip through the holder.

3. In a feeding device for strip material, a hollow grip member, a hollow directing tube, a material strip extending through the grip member and tube, and angularly disposed plate intermediate the grip member and tube having an aperture through which the strip extends, the edges of said aperture being adapted to grip the strip on opposite sides, and means for bodily moving the plate to advance the strip through the grip member and tube.

4. In a feeding device for strip material, a hollow grip member, a hollow directing tube, a material strip extending through the grip member and tube, a pivoted plate intermediate the grip member and tube having an aperture through which the strip extends, a spring for holding the plate in an angular position with respect to the strip so that the edges of the aperture firmly grip the strip, and means for bodily moving the plate to advance the strip.

5. In a feeding device for strip material, a hollow holder adapted to support a material strip extending therethrough, an angularly disposed pivoted plate having an aperture through which the strip extends for positively gripping the strip on opposite sides when the plate is moved in one direction, but adapted to release the grip and slide on the strip when moved in the opposite direction, and means for bodily moving the plate first in one direction to advance the strip, and then in the opposite direction to its orginal position.

6. In a feeding device for strip material, a hollow holder, a material strip extending through the hollow holder, a movable support, a plate pivotally mounted on the support having an aperture through which the strip extends, a spring for resiliently holding the plate in an angular position to grip the strip, and an operating member for moving the support and pivoted plate to advance the strip.

7. In a feeding device for strip material, a holder adapted to support a strip material, a plurality of movable members each adapted to grip the strip when advanced, and means for successively advancing the members.

8. In a feeding device for strip material, a holder adapted to support a strip material, a plurality of movable members each adapted to grip the strip when advanced but release the strip when retracted, means for successively advancing the members, and means for sucessively retracting the members alternately with respect to the advancing means.

9. In a feeding device for strip material, a holder, a strip material supported by the holder, a plurality of movable members each adapted to grip the strip when advanced, but release the strip when retracted, and operating means for advancing one of the said members and retracting the other of said members during part of the movement of said means and for advancing the second mentioned member and retracting the first mentioned member during the remainder of the movement of said means.

10. In a feeding device for strip material, a holder, a material strip supported by the holder, a plurality of movable members on opposite sides of the strip adapted to grip the strip when advanced but release the strip when retracted, a pivoted operating lever for advancing one of said members and retracting the other of said members when moved in a direction about its pivot and for advancing the second mentioned member and retracting the first mentioned member when moved in the opposite direction about its pivot.

11. In a feeding device for strip material, a holder, a material strip supported by the holder, a pivoted operating lever for advancing the strip, a plurality of members carried by the lever on opposite sides of the pivot, adapted to grip the strip when advanced but release the strip when retracted, a handle adjacent the holder for moving the lever about its pivot in one direction, a spring for moving the lever about its pivot in the opposite direction when the handle is released so that the gripping members are moved in the same direction in the alternate succession for continuously advancing the strip through the holder.

12. In a feeding device for strip material, a holder, a material strip supported by the holder, a plurality of plates having apertures through which the strip extends, said plates being resiliently held in angular relation with respect to the strip so that the edges of the aperture firmly grip the strip, and means for moving the plates in the same direction in alternate succession for continuously advancing the strip through the holder.

13. In a feeding device for strip material, a holder, a material strip supported by the holder, a plurality of angularly disposed pivoted plates having apertures through which the strip extends for positively gripping the strip when either of the plates is moved in one direction but adapted to release the grip and slide on the strip when moved in the opposite direction, and means for moving the plates in the same direction in alternate succession for continuously advancing the strip through the holder.

14. In a feeding device for strip material, a hollow grip member, a hollow directing tube, an intermediate member for connecting the grip member and tube having an opening, a material strip extending through the hollow grip member, opening, and tube, and means positioned within the opening for holding and advancing the strip comprising a pivoted operating member, pivoted plate members carried by the operating member on opposite sides of the strip and provided with apertures through which the strip extends, and springs for holding the plates angularly disposed so that the edges of the aperture will grip the strip whereby the strip will be advanced when the operating member is moved about its pivot.

15. In a feeding device for a strip material, a hollow holder, a hollow directing tube, an intermediate member for connecting the holder and tube provided with a transverse opening, a lever pivoted to the intermediate member and extending through said opening, plates pivotally connected to the lever on opposite sides of the intermediate member and extending into the opening, said plates being provided with apertures, a material strip extending through the holder, tube and apertures in the plate members, a handle adjacent the holder for moving the lever about its pivot in one direction, a spring for moving the lever about its pivot in the opposite direction when the handle is released, and resilient means for moving the plates about their pivots to grip the strip and advance the same in alternate succession when the lever is operated by the handle and spring.

16. In a feeding device for strip material, a hollow holder, a hollow directing tube, an intermediate member for connecting the holder and tube provided with a transverse opening, a material strip extending through the hollow holder, opening and tube, a lever pivoted to the intermediate member and extending through said opening, grip members carried by the lever on opposite sides of the pivot adapted to grip the strip when advanced, but release the strip when retracted, a handle adjacent the holder for moving the lever about its pivot in one direction and advancing one of said grip members and strip, and retracting the other of said grip members, and a spring for moving the lever in the opposite direction about its pivot when the handle is released for advancing the retracted grip member and strip and retracting the advanced grip member to their original position.

In testimony whereof I have signed this specification.

WILLIAM W. CARSON, Jr.